United States Patent [19]
Peters

[11] 3,914,037
[45] Oct. 21, 1975

[54] LAP MODEL MICROFILM VIEWER

[75] Inventor: Arnis E. Peters, La Crosse, Wis.

[73] Assignee: Gelatt Investments, Inc., La Crosse, Wis.

[22] Filed: Dec. 12, 1973

[21] Appl. No.: 423,932

Related U.S. Application Data

[63] Continuation-in-part of Ser. No. 175,123, Aug. 26, 1971, Pat. No. 3,785,728, which is a continuation-in-part of Ser. No. 90,514, Nov. 18, 1970, Pat. No. 3,700,321.

[52] U.S. Cl. .................... 353/26; 353/78; 353/119
[51] Int. Cl.² ................... G03B 21/11; G03B 21/28; G03B 23/12
[58] Field of Search .................. 353/26, 27, 74–78, 353/119

[56] References Cited
UNITED STATES PATENTS

| | | | |
|---|---|---|---|
| 3,661,394 | 5/1972 | Siller | 274/4 C |
| 3,679,298 | 2/1970 | Knowles | 353/26 |
| 3,694,067 | 9/1972 | Clement | 353/26 |
| 3,739,069 | 6/1973 | Sandmeir | 353/119 |

Primary Examiner—Samuel B. Rothberg
Assistant Examiner—A. Jason Mirabito
Attorney, Agent, or Firm—Norman Lettvin

[57] ABSTRACT

A compact microfilm viewer adapted to be lap held which includes a casing having a viewing screen in an upper surface thereof and a pivotally openable end construction which carries a mounting deck for removably receiving a microfilm cassette that has a projection window at which individual frames of the microfilm can be exposed. The end construction is arranged such that when it is closed, (1) the mounting deck is positioned in a plane substantially transverse to the plane of the screen, and (2) the cassette and window are aligned with optical and illuminating means on the casing so that the image from a frame in said window is enlarged and projected on the viewing screen. Manual drive means are associated with the end construction for transporting the film in the cassette in either a forward or reverse direction so as to permit selection and exposure of different frames at the window.

5 Claims, 5 Drawing Figures

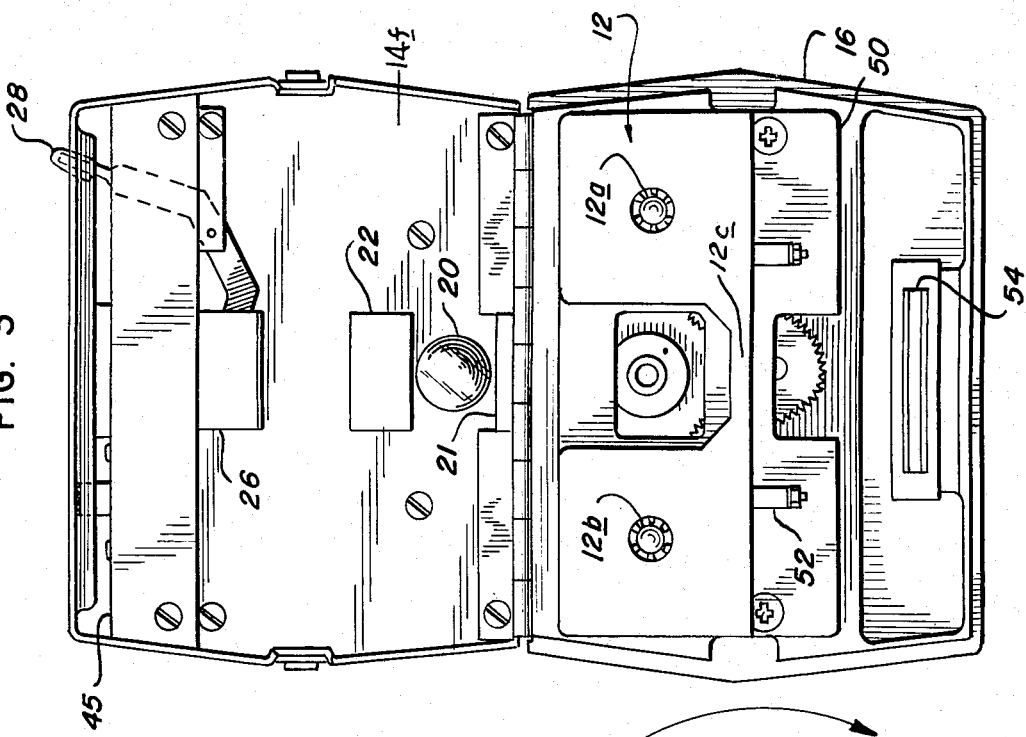
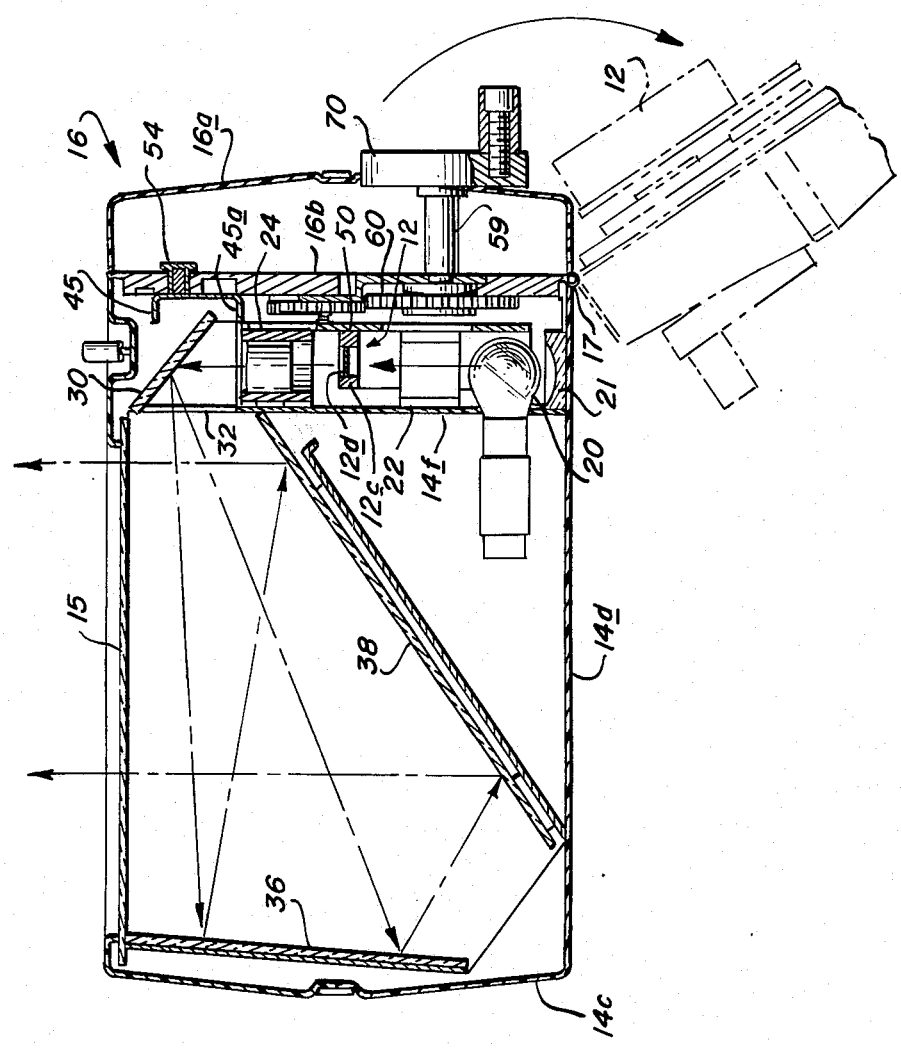

3,914,037

LAP MODEL MICROFILM VIEWER

CROSS REFERENCE TO RELATED APPLICATIONS

This application is a continuation-in-part of U.S. Pat. application Ser. No. 175,123, filed Aug. 26, 1971 U.S. Pat. No. 3,785,728 issued Jan. 15, 1974 which is a continuation-in-part of U.S. Pat. application Ser. No. 90,514 U.S. Pat. No. 3,700,321 issued Oct. 24, 1972 filed Nov. 18, 1970.

BACKGROUND OF THE INVENTION

This invention relates to microfilm viewers and in particular to a compact, lap-holdable viewer.

Microfilm viewers for use with cassettes containing a microfilm strip having a plurality of individual microphotographs or frames thereon, are disclosed in the above-identified applications. Each of these viewers is adapted for desk top use and includes a stand which is deployed so as to align internal mirrors which enlarge and project an image on a viewing screen.

It is an object of this invention to provide a smaller, viewer which can be held in the lap of the user and within which the internal mirrors are secured to the casing in an enlarging and projecting alignment.

In the latter of the two above-identified applications there is disclosed a reversible, high-speed, power-operated, drive system which cooperates with winding reels within the cassette to transport the film in the cassette at high speeds, in one direction or the other past the projection window in the cassette.

It is an object of this invention to incorporate the reversible features of the drive system in a small, manually-operated, lap-model microfilm viewer.

These and other objects of the invention will become apparent from the following description and appended claims.

SUMMARY OF THE INVENTION

There is provided by virtue of this invention a small compact microfilm viewer structure which can be held in the lap of the user and which includes a reversible manually-operated drive system. The viewer includes a pivotally openable end construction having a mounting deck for carrying the microfilm cassette, which deck is oriented transversely with respect to the viewing screen when the end construction is closed. This transverse orientation coupled with a novel arrangement for the optical means and projection means permits the construction of a short and compact viewer. The optical means and projection means for enlarging an exposed frame and projecting it onto the viewing screen are fixedly positioned to and within the casing so as to permit the viewer to be lap-held. Drive bit means are provided in association with the deck for cooperation with winding reels within the cassette which cooperate with the film strip to move it in one direction or the other past the projection window.

BRIEF DESCRIPTION OF THE DRAWINGS

FIG. 2 is a longitudinal, vertical sectional view taken substantially along lines 2—2 of FIG. 1 showing the interior of the viewer and showing, in broken lines, a portion of one end of the viewer in an open position;

FIG. 3 is an end view of the casing with the end open showing a microfilm cassette on the mounting deck;

DESCRIPTION OF THE PREFERRED EMBODIMENT

Figure 1:
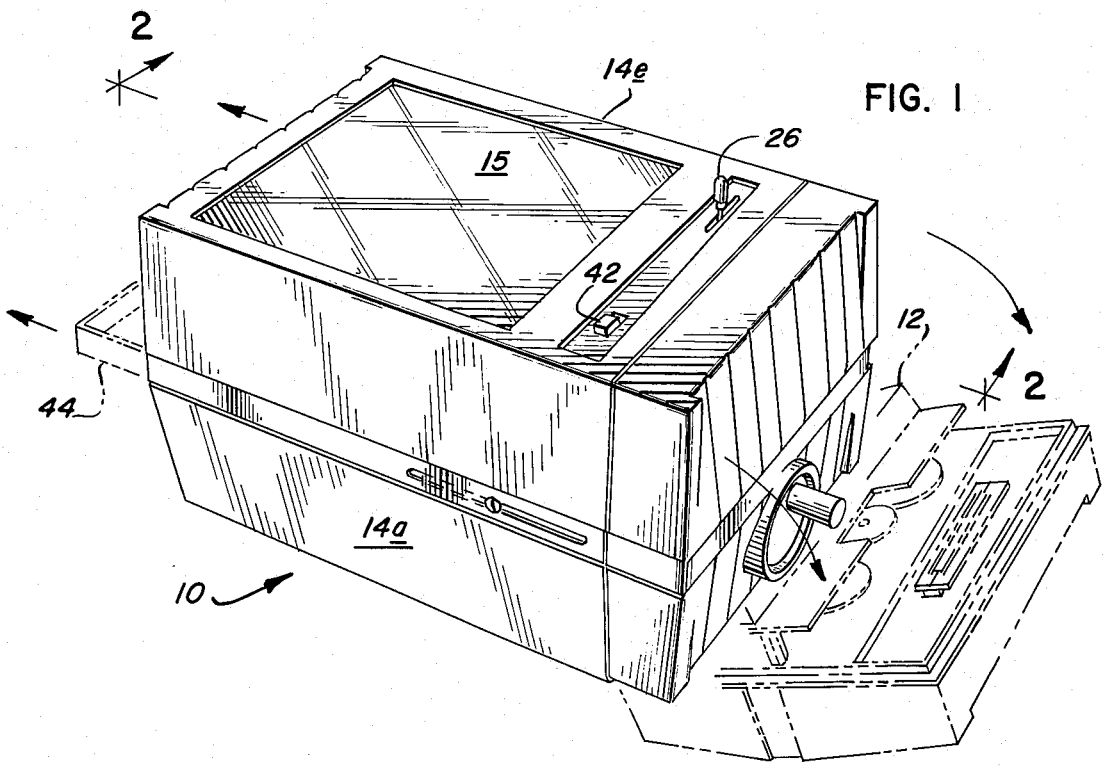
FIG. 1 is a perspective view showing the microfilm viewer in the closed position and showing, in broken lines, one end of the viewer in the open position.
Figure 4:
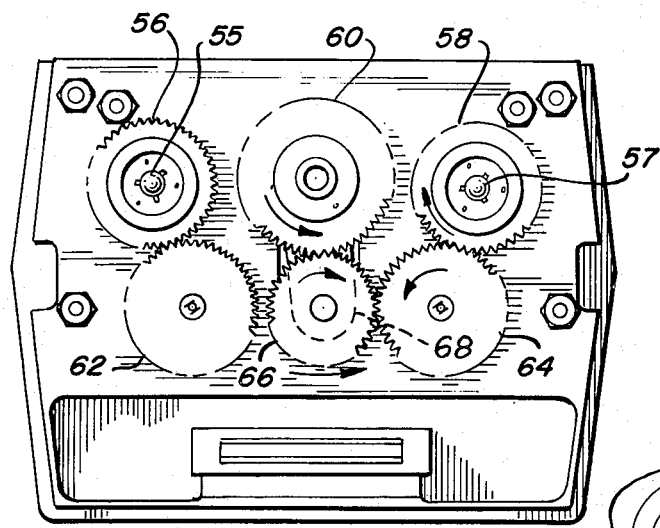
FIG. 4 is an elevational view of the end as in FIG. 3, with the mounting deck removed, and showing the gear system associated with the drive system with the gears arranged for driving in one direction.
Figure 5:
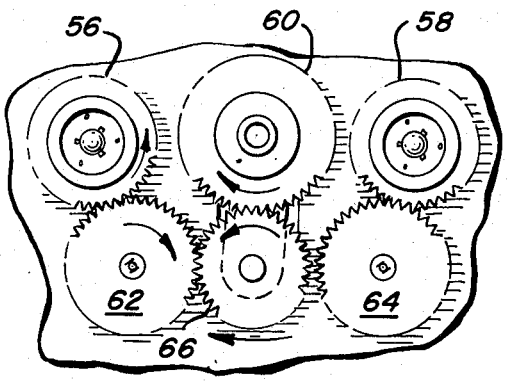
FIG. 5 is a fragmentary view similar to FIG. 4 showing the gears arranged for driving in the opposite direction.

Referring now to the drawings, a viewer 10 generally is shown which cooperates with a cassette 12 which contains a microfilm strip that is wound about a pair of reels 12a and 12b for transporting the filmstrip in one direction or the other. The cassette includes a bight portion 12c which has a projection window 12d extending therethrough, at which individual microphotographs or frames on the filmstrip can be selectively positioned for projection.

The viewer itself includes a main body or casing portion 14 and a pivotally connected end construction 16 which is hingedly mounted to the casing. The casing defines side walls 14a and 14b, a closed end wall 14c, a bottom wall 14d and an apertured, upper surface 14e adjacent which the viewing screen 15 is mounted. An inner chamber-forming or support wall 14f, positioned inwardly of the ends of the side walls, bottom wall and upper surface, closes the open end of the casing so as to form an internal reflection chamber below the viewing screen 15.

A projection lamp 20 is positioned so that the filament is positioned on the outerside of the chamber-forming wall 14f adjacent the bottom wall 14d. A spherical reflector 21 is provided on the bottom wall adjacent the wall 14f for reflecting downwardly directed light upwardly. Optical means which include a collimating lens 22 and objective lens 24 spaced therefrom are mounted to the support wall 14f and are arranged to be in optical alignment with the lamp 20 and reflecting means 21. The objective lens 24 includes a sleevelike construction 26 within which the lens elements are mounted and which is movable by means of a lever 28.

A small reflecting mirror 30 is mounted on the casing 14 adjacent the upper surface 14e for reflecting light passing through the objective lens 24, through an aperture 32 in the wall 14f. The light reflected from the small or first mirror 30 is directed to a second or enlarging mirror 36 which is rigidly mounted adjacent the end wall 14c at an attitude generally parallel to the compartment wall and transverse to the side walls and viewing screen. The light received by the second mirror 36 is reflected to a third or enlarging mirror 38 which is also fixedly secured within the compartment at an attitude transverse to the compartment wall, bottom wall and side walls, and at an angular attitude with respect to the compartment wall and the bottom wall so that light received by the third mirror is projected upwardly onto the underside of the viewing screen 15.

An on and off switch 42 is provided in the top surface of the casing adjacent the viewing screen for controlling the projection lamp 20 and a telescoping-style carrying handle 44 is provided adjacent the closed end of the casing and secured to the side wall thereof for carrying the viewer. An elongated, L-shaped metal strip 45 is provided which extends across the upper portion of the casing and between the side walls thereof for protecting the first reflecting mirror 30 and includes an aperture portion 45a in the lower leg through which light from the objective lens 24 passes through to the first mirror 30.

The end construction 16 includes a dish-shaped exterior shell 16a and a support wall 16b which is mounted to and extends across the inner open end of the shell. Hinges such as 17 are affixed to an edge of the casing 14 and an edge of the end construction 16 so as to provide a pivotal interconnection therebetween.

The end construction 16 carries a mounting deck 50 which is mounted in fixed, spaced parallel relation to the support wall 16b and has mounted thereto a pair of leaf springs 52 for engaging the cassette 12. At the upper end, or end distal from the hinges, the end construction carries a pair of spaced latching magnets 54, generally, which are positioned to magnetically engage the upper leg of the metal strip 45 on the casing so as to latch the casing closed.

The viewer may be closed by swinging the end construction upwardly until the magnets latchingly grasp the strip 45 and the viewer is opened by grasping the end construction 16, and swinging it downwardly to unlatch the magnets 54.

The system for transporting the film within the cassette includes a pair of spaced or elongated drive hubs 55 and 57 which cooperatively engage the cassette reels 12a and 12b. With the cassette reels in engagement with the drive hubs and the leaf springs 52 engaging the cassette, the cassette is firmly held against the deck.

The ends of the drive hubs extend through the mounting deck and are operatively associated with a pair of drive gears 56 and 58. An elongated drive shaft 59 is journaled to the shell 16a and the support wall 16b and extends in a direction parallel to the drive hubs and transversely to the side of the support deck. The shaft terminates between the wall 16b and the deck 50 and at the end carries the first gear 60. At the outer side of the wall a manual reversible drive knob 70 is positioned and secured to the shaft 59. Transfer gear means are provided between the shaft 59 and the two hubs for effecting positive drive from the shaft to only one or the other of the two hubs, depending upon the direction in which the shaft is rotated. The transfer gear means includes 4 gears located in a plane transverse to the axis of the drive shaft and hubs, and are positioned between the wall 16b and support deck 50. The first of the four gears 60 mounted on the drive shaft rotates therewith, the second and third gears 62 and 64 are spaced from the first gear 60, are journaled to the wall 16b and are each drivingly associated with one of the hub gears 56 or 58. The fourth gear 66 constantly meshes with the first gear 60 and is held in spaced relation to the axis of the driven shaft by an arm 68 so that as the first gear rotates, the fourth gear is caused to automatically planet about the axis of the drive shaft into meshing and driving relation with one of the second and third gears. Thus the drive shaft 59 rotates in an opposite direction as the fourth gear 66 which operates the drive of the second or third gears.

In operation, the viewer is held on the lap of the user and with the end construction 16 in the open position a cassette, such as 12, is pushed into the drive hubs and held in place by the leaf springs such as 52. The end in then pivoted to the closed position in which the deck is at an attitude generally transverse to the plane of the viewing screen 15 and with the cassette 12 in a position, such that the bight portion 12c and window 12d are positioned between the columnating lens 22 and objective lens 24 and in optical alignment with the projection lamp 20. The switch 42 is thrown which activates the lamp which then projects light through the columnating lens, through the projection window 12c and thus projects the image of microphotograph in the window onto the objective lens. The objective lens then directs the image to the first enlarging mirror, from which it is reflected through the aperture 32 to the second enlarging mirror 36, the third enlarging mirror 38 and on the underside of the screen 15. The image is focused on the screen by moving the lever 28 which moves the objective lens 24 so as to focus the image.

Once the image has been focused, individual microphotograph frames can be located by rotating the manual operator handle 70 which through the transfer system rotates the reels about which the microfilm is wound. Rotation in one direction causes the film to be transported in one direction and opposite rotation causes it to be transported in the opposite direction so that particular individual frames can be selected for viewing.

It will be appreciated that numerous changes and modifications can be made to the embodiment disclosed herein without departing from the spirit and scope of this invention.

What is claimed and desired to be secured by Letters Patent of the United States is:

1. In a microphotograph viewer provided with means for selection, illumination, enlarging projection, reflection, and display upon a viewing screen of an enlargement of a microphotograph that is provided on a film strip carried within a cassette in which the film strip is arranged to move through the cassette's bight; the improvement of a lap-model size viewer comprising, in combination: an elongated casing providing walls surrounding a reflection chamber in which is effected enlarging projection and reflection of an illuminated microphotograph that is to be seen upon a viewing screen located in one of the longitudinal walls of the casing, said reflection chamber also being bounded by a support wall that extends transverse to the elongated casing and is spaced longitudinally from the ends of the casing's longitudinal walls that are distal from the reflection chamber to provide an exposable casing end recess in which are positioned illumination means and lens means having spaced apart portions to accommodate entry of the bight portion of a film carrying cassette therebetween; an end construction hinged to said terminal end of one of the longitudinal walls of the casing to swing between a closed position in which the viewer may be operated and an open position in which the illumination means and lens means are exposed for ready access thereto, said end construction providing means for selective mounting thereon of a bighted film cassette so that when the end construction is in closed position the cassette's bight is positioned between the spaced apart portions of the lens means in the end recess of the casing, and drive means on the end construction including a control handle extending outwardly of the end construction for selectively moving the cassette's film strip through the cassette's bight.

2. A viewer as in claim 1 wherein there is mounted in the end recess, in optical alignment in a plane, transverse to the viewing screen on the casing and spaced outwardly of the support wall and between said support wall and said terminal ends of the casing's longitudinal walls, projection lamp means, collimating lens means, objective lens means, and mirror means, and said support wall having an aperture therethrough adjacent the mirror means arranged so that light reflected from the mirror means enters the reflection chamber through said aperture.

3. A viewer as in claim 2 including a reflector operatively associated with the projection lamp means, and wherein the reflective face of the mirror means is angled with respect to both the axis of optical alignment and the aperture in the support wall, and an elongated mirror-protecting member arranged to extend between spaced walls of the casing and being shaped and arranged to substantially exclude light except as directed against the mirror means through the objective lens means.

4. A viewer as in claim 1 wherein the end construction includes a support wall, a support deck carried by the support wall in parallel relation thereto and spaced therefrom in the direction toward entry into the end recess of the casing when the end construciton is in its closed position, the support deck carrying spaced drive hubs onto which a cassette is to be removably positioned and for effecting selective movement of the film within the cassette, gear means located in the space between the support wall and support deck and operatively associated with the drive hubs, and a handled drive shaft operatively associated with the gear means and extending from the support wall in a direction opposite from the support deck.

5. A viewer as in claim 4 including a mirror in the end recess of the casing, an elongated mirror-protecting metal member in the end recess extending between spaced walls of the casing, the support wall carrying a magnetic latch for cooperation with said elongated metal member, and the support deck being of a size and so located as to provide unobstructed entry of the support deck and the cassette carried thereon into the end recess of the casing.

* * * * *